Patented June 20, 1944

2,351,678

UNITED STATES PATENT OFFICE 2,351,678

PROCESS FOR THE RECOVERY OF TUNGSTEN FROM ITS ORES

Robert G. Hall, San Francisco, Calif.

No Drawing. Application November 3, 1943,
Serial No. 509,019

6 Claims. (Cl. 23—18)

This invention relates to a process for recovering tungsten from its ores and especially from scheelite or calcium tungstate.

In the extraction of tungsten from its ores by gravity and flotation methods, great difficulties are found in making such concentration as will give a merchantable product and grade, and even greater difficulties are found in the removal of some very deleterious ingredients such as phosphorous and sulphur.

The object of the present invention is generally to improve and simplify the operation of recovering tungsten from scheelite and other of its ores; to provide a process whereby is manufactured from ores or low grade and impure concentrates a very pure and readily marketable product consisting either of iron tungstate or tungstic oxide; to provide a process in which a great production in quantity of reagents employed may be accomplished, and certain reagents recovered for reuse, and further to provide reagents of low cost, to wit, soda ash and sulphuric acid.

The process is applicable to ores of low tungsten content as well as to rich ores and concentrates. The ore or material to be treated will be ground to pass a suitable mesh screen and will then be subjected to dissolution in a solution of soda ash.

In actual practice dissolution of the scheelite is accomplished in a solution of sodium carbonate at an elevated temperature, complete dissolution being obtained on this material at a temperature corresponding to a pressure of about 200 lbs. gauge or at about 380° to 390° F. Such a pressure is obtainable in a closed cylindrical vessel or autoclave rotated about its major axis horizontally and heated with steam in an internally placed closed coil heater; this system of heating is preferable as it prevents dilution of the solution with condensate and, furthermore, returns the condensate automatically at full temperature to the boiler supplying the steam.

The pulp ratio employed in the autoclave may be three parts of water to one part of flotation concentrates by weight or more or less according to grade and to this is added sodium carbonate ($Na_2CO_3$) generally in the amount of 2 parts or more $Na_2CO_3$ to 1 part $WO_3$ by weight.

While the dissolution is taking place in the autoclave, pressure may vary from low pressure up to 200 lbs. per square inch or more. However, at high pressure a more complete extraction is obtained in a shorter time than at lower pressure. Under these conditions dissolution of scheelite takes place according to the following equation:

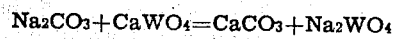
$$Na_2CO_3 + CaWO_4 = CaCO_3 + Na_2WO_4$$

The above reaction indicates the theoretical requirement of about 1 part $Na_2CO_3$ to 2 parts $WO_3$ by weight, but since an actual excess above this theoretical amount is required by the conditions set forth, besides calcium carbonate and sodium tungstate a considerable excess of sodium carbonate is also present, at the completion of the reaction.

The actual time required for complete dissolution of the calcium tungstate is from two and one-half to four hours, depending upon the temperature and pressure employed.

After dissolution has been completed, the hot pulp will be removed from the autoclave and passed to a filter where it is washed and finished and the ore pulp together with the calcium carbonate is removed. The first step of the process is not complete and leaves a solution of

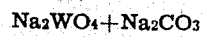
$$Na_2WO_4 + Na_2CO_3$$

or sodium tungstate and sodium carbonate in the molecular proportion of 1:3 more or less.

The second step consists in neutralizing the sodium carbonate, but before describing the manner in which this is accomplished, the following statement should be considered:

On account of the excess of base in the solution, it is impossible to precipitate the tungsten in any form by any base without precipitating also a large amount of material not desired. This excess of $Na_2CO_3$ in other processes is usually neutralized by the addition of calcium chloride or hydrochloric acid, but such chemicals are expensive, and chemical and mechanical difficulties arise from their use.

I have found that for the purposes of this invention, the use of commercial sulphuric acid is convenient both chemically and mechanically and does not result in any precipitation of objectionable solids which have to be filtered out. I accordingly add to the solution of sodium tungstate and sodium carbonate just sufficient sulphuric acid to neutralize the sodium carbonate thus—

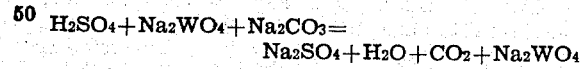
$$H_2SO_4 + Na_2WO_4 + Na_2CO_3 = Na_2SO_4 + H_2O + CO_2 + Na_2WO_4$$

The third step of the process consists in precipitating the tungsten as tungstate of iron, and to accomplish this I make use of the cheaper and more easily obtainable ferrous sulphate in molecular proportions. Thus $$Na_2WO_4 + FeSO_4 = FeWO_4 + Na_2SO_4$$

from which the FeWO$_4$ precipitates and is filtered out, washed and dried after which it may be readily marketed for all the various uses of tungsten. The FeWO$_4$ contains approximately 77% WO$_3$ and by the method or process employed is substantially pure according to formula.

If it is desired to market the product in the form of WO$_3$ or tungstic oxide, it is only necessary to treat the FeWO$_4$ with sulphuric acid whereby ferrous sulphate is recovered for reuse as in step 3 and tungstic acid (H$_2$WO$_4$) remains as an insoluble residue. By drying and heating the H$_2$WO$_4$ to 200–250° F. the water content is expelled leaving substantially pure WO$_3$.

The advantages of this method of operation are:

(a) Great reduction in quantity of reagents, and low cost of those used—soda ash and sulphuric acid.

(b) Great purity of the product. The product thus produced contains substantially one hundred per cent tungstic acid or anhydride, and is free from objectionable impurities of the commercial tungsten products at present marketed, such as phosphorus and sulphur, and the diluents lime and silica so frequently found in present commercial products. The usual concentrates now marketed contain about 50–60% tungstic oxide.

(c) Ready solubility of the tungstic acid so prepared in the usual solvents such as ammonia and its compounds, and its availability for the manufacture of tungsten chemical products, as well as for reduction to metallic tungsten and its alloys and carbides.

(d) The recovery of the whole of the iron salt used as ferrous sulphate in a concentrated solution for use again as precipitant of the tungsten as ferrous tungstate, thus not only recovering the iron as sulphate solution, but also returning to the system the small amounts of tungsten remaining in the ferrous sulphate. I have found that this is very necessary since tungstic acid is slightly soluble in the solution of ferrous sulphate, even with the use of a slight excess of sulphuric acid.

(e) The use of the bivalent ferrous sulphate is of great advantage over the trivalent ferric sulphate in its more ready dissolution by sulphuric acid without excess.

(f) The advantages of using this method of recovering tungsten from sodium tungstate solution by the sulphate method instead of the chloride method are several:

1. Cost of sulphuric acid per molecule unit for neutralization is materially below the cost of hydrochloric acid.

2. For convenience in transport and use it is much to be preferred.

3. The above method of cyclical use of iron makes its cost nominal, whereas the calcium chloride as used at present is expensive and wasteful. Any use of calcium oxide or salts prohibits the use of sulphuric acid on account of the insoluble salts resulting.

The precipitate of calcium tungstate is also undesirable since it is not decomposed by acid and makes the preparation of tungsten oxide or soluble salts therefrom very difficult. Calcium tungstate contains when pure about 78% WO$_3$, whereas the method herein set forth produces a product when calcined of about 100% WO$_3$.

While this and other features of my invention have been more or less specifically described, I nevertheless wish it understood that changes may be resorted to within the scope of the appended claims, and that the materials employed may be varied according to the experience of the manufacturer and as varying conditions of use may demand.

Having thus described my invention, what I claim and desire to secure by Letters Patent is:

1. A process for the recovery of tungsten from its ores which consists in dissolution of a tungsten containing ore in a hot solution of sodium carbonate and conversion of the tungsten to sodium tungstate, converting excess sodium carbonate in the solution to sodium sulphate by the addition of sulphuric acid, and converting the sodium tungstate to iron tungstate by the addition of ferrous sulphate.

2. A process for the recovery of tungsten from its ores which consists in dissolution of a tungsten containing ore in a hot solution of sodium carbonate and conversion of the tungsten to sodium tungstate, converting excess sodium carbonate in the solution to sodium sulphate by the addition of sulphuric acid, converting the sodium tungstate to iron tungstate by the addition of ferrous sulphate, removing the tungstate of iron, adding sulphuric acid thereto to form ferrous sulphate and tungstic acid, and drying and heating the tungstic acid to form tungstic oxide.

3. A process for the recovery of calcium tungstate from scheelite which consists in dissolution of calcium tungstate in a hot solution of sodium carbonate and conversion of the calcium tungstate to sodium tungstate, converting excess sodium carbonate of the solution to sodium sulphate by the addition of sulphuric acid, and converting the sodium tungstate to iron tungstate by the addition of ferrous sulphate.

4. A process for the recovery of calcium tungstate from its ores which consists in dissolution of calcium tungstate in a hot solution of sodium carbonate and conversion of the calcium tungstate to sodium tungstate, adding sulphuric acid to the solution to convert the sodium carbonate to sodium sulphate, and then adding to the solution ferrous sulphate to precipitate tungstate of iron.

5. A process for the recovery of calcium tungstate from its ores which consists in dissolution of calcium tungstate in a hot solution of sodium carbonate and conversion of the calcium tungstate to sodium tungstate, adding just sufficient sulphuric acid to the solution to neutralize the sodium carbonate and to convert it to sodium sulphate, and then adding to the solution ferrous sulphate in molecular proportion to precipitate tungstate of iron.

6. A cyclical process for the recovery of calcium tungstate from its ores which consists in dissolution of calcium tungstate in a hot solution of sodium carbonate and conversion of the calcium tungstate to sodium tungstate, adding sulphuric acid to the solution to convert the sodium carbonate to sodium sulphate, adding ferrous sulphate to precipitate tungstate of iron, removing the tungstate of iron, adding sulphuric acid thereto to form ferrous sulphate for reuse and tungstic acid, and drying and heating the tungstic acid to form tungstic oxide.

ROBERT G. HALL.